US007385580B2

(12) United States Patent
Saitou et al.

(10) Patent No.: US 7,385,580 B2
(45) Date of Patent: Jun. 10, 2008

(54) ACTIVE MATRIX DISPLAY DEVICE FOR CHANGING VOLTAGE BASED ON MODE OF OPERATION

(75) Inventors: Kouji Saitou, Yokohama (JP); Toshihiro Yanagi, Nara (JP); Taketoshi Nakano, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 519 days.

(21) Appl. No.: 10/660,567

(22) Filed: Sep. 12, 2003

(65) Prior Publication Data

US 2004/0056834 A1 Mar. 25, 2004

(30) Foreign Application Priority Data

Sep. 25, 2002 (JP) ............................ 2002-279993

(51) Int. Cl.
*G09G 3/36* (2006.01)
*G09G 5/00* (2006.01)
*G06F 3/038* (2006.01)

(52) U.S. Cl. ........................................ 345/94; 345/208

(58) Field of Classification Search ............ 345/87–89, 345/94–98, 208
See application file for complete search history.

(56) References Cited

U.S. PATENT DOCUMENTS

| | | | | |
|---|---|---|---|---|
| 5,751,267 | A | 5/1998 | Sato et al. | |
| 6,297,791 | B1 * | 10/2001 | Naito et al. | 345/89 |
| 6,600,465 | B1 * | 7/2003 | Koyama | 345/87 |
| 6,784,863 | B2 * | 8/2004 | Yanagi et al. | 345/96 |
| 7,084,849 | B2 * | 8/2006 | Noguchi et al. | 345/96 |
| 2002/0109655 | A1 | 8/2002 | Yer et al. | |

FOREIGN PATENT DOCUMENTS

| | | |
|---|---|---|
| JP | 06-295164 | 10/1994 |
| JP | 10-333648 A | 12/1998 |
| KR | 2002-0054874 | 7/2002 |

OTHER PUBLICATIONS

Korean Office Action issued on Jun. 30, 2005 and English translation thereof.

* cited by examiner

*Primary Examiner*—Amr A. Awad
*Assistant Examiner*—Steven E Holton
(74) *Attorney, Agent, or Firm*—Harness, Dickey & Pierce, P.L.C.

(57) ABSTRACT

A liquid crystal display device includes a liquid crystal display panel, a row electrode drive circuit (scanning signal line drive circuit), a column electrode drive circuit (source signal line drive circuit), a power supply circuit, a common electrode drive circuit, and a memory (storage means). The memory stores the respective optimum applied voltages for the source electrode corresponding to display modes of the liquid crystal display device, a reflective mode and a transmissive mode. With the above arrangement, in the case where the display mode is switched among a plurality of display modes, the above active matrix display device can reset an optimum applied voltage for a common electrode or a source electrode in accordance with each of the display modes to suppress the occurrence of flickers, thus allowing the display device to maintain a high quality of display all the time.

9 Claims, 10 Drawing Sheets

ACTIVE MATRIX DISPLAY DEVICE FOR CHANGING VOLTAGE BASED ON MODE OF OPERATION

FIELD OF THE INVENTION

The present invention relates to an active matrix display device which makes it possible to display images in a plurality of display modes, more specifically, relates to an active matrix display device which can suppress the occurrence of flickers, thus enhancing a quality of display.

BACKGROUND OF THE INVENTION

A liquid crystal display device is preferably driven by AC voltage to lengthen a useful life of liquid crystal material.

However, since a parasite capacitance Cgd exists between a gate electrode and a drain electrode as shown in FIG. 9(*a*), a voltage level Vs written into a source electrode is drawn and varies (ΔV) when the gate electrode switches from ON (Vgon) to OFF (Vgoff), resulting in decrease to Vd, as shown in FIG. 9(*b*). This variation is expressed by the following equation:

$$\Delta V = Cgd/(Clc + Ccs + Cgd) \times (Vgon - Vgoff),$$

where Clc is liquid crystal capacitance, and Ccs is storage capacitance.

Therefore, in view of ΔV, a common electrode voltage (Vcom) and a source electrode voltage (Vs) must be adjusted by shifting their respective center values.

To a liquid crystal layer of each pixel, an electric potential difference between the common electrode voltage (Vcom) and the source electrode voltage (Vs) is supplied as a liquid crystal drive voltage. For this reason, when a variation ΔV occurs between a center of a voltage waveform for the common electrode and a center of a voltage waveform for the source electrode constituting a pixel electrode, difference in amplitude between the positive side and the negative side in a voltage waveform causes a variation of the liquid crystal drive voltage, resulting in the occurrence of flickers.

Further, a value of the liquid crystal capacitance Clc varies in black display and in white display, which causes variations ΔV of different values. This requires further adjustment.

In this connection, in the halftone display shown in FIG. 10, a voltage waveform of a voltage applied to the common electrode or a voltage waveform of a voltage applied to the source electrode must be shifted to match the center ($Vcom_1$) of a voltage waveform of a voltage applied to the common electrode (Vcom) with the center ($Vs_1$ or $Vs_2$) of a voltage waveform of a voltage applied to the source electrode (Vs) for preventing the occurrence of flickers caused by variations of the liquid crystal drive voltage.

A conventional liquid crystal display device 50, as shown in FIG. 11, includes an offset circuit 52, connected to a common electrode drive circuit 53, which is provided with a variable resistor 51. For example, Japanese Laid-Open Patent Application No. 295164/1994 (Tokukaihei 6-295164; published on Oct. 21, 1994) discloses a liquid crystal display device which can adjust a voltage applied to a common electrode by the use of a variable resistor.

The value of the foregoing ΔV varies due to the variations of panels caused in the manufacturing process and other reasons. Therefore, an optimum applied voltage is applied to the common electrode in such a manner that the variable resistor 51 in the offset circuit 52 is independently adjusted to match the center of the voltage waveform for the common electrode with the center of the voltage waveform for the source electrode. This enables a shift in waveform of the common electrode voltage, thus preventing the occurrence of flickers.

However, the foregoing conventional liquid crystal display device 50 has the following problems.

That is, for reduction of power consumption, has been proposed in recent years a semi-transmissive liquid crystal display device including a plurality of display modes such as reflective mode in which external light is utilized for displays with a back light (hereinafter referred to as BL) turned off and a transmissive mode in which BL is utilized for displays.

As to a liquid crystal display device for displaying images in one display mode such as transmissive mode, no problems occur when an optimum applied voltage is once set because change of a display mode is not required. However, as to a liquid crystal display device capable of displays in a plurality of modes, change of a display mode causes change in liquid crystal capacitance Clc due to a different light propagation route. This causes increase in the value of ΔV, as compared to the value of ΔV obtained by the foregoing equation. Accordingly, the amount of drawn voltage in the source electrode voltage increases, resulting in a shift of the center of the voltage waveform for the source electrode voltage.

For example, as shown in FIG. 10, when the center of the voltage waveform for the common electrode voltage (Vcom) before shifted is $Vcom_1$, and a center of an optimum voltage of the source electrode voltage (Vs) is $Vs_1$ in the transmissive mode, the center $Vs_1$ of the optimum voltage of the source electrode voltage shifts to $Vs_2$ when the display mode is switched to the reflective mode. On this account, a value of the optimum voltage also shifts under the condition where setting is carried out in accordance with a display mode before switched, resulting in the occurrence of flickers.

Such a variation about the center of the voltage waveform, i.e. a variation about an optimum applied voltage, caused by switch of the display mode is as much as 0.1V to 0.2V, which is considerable. Therefore, in order to prevent the occurrence of flickers caused by switch of the display mode, the optimum applied voltage applied to the source electrode must be set again after the display mode is switched to match $Vcom_1$ with $Vs_2$.

However, in the conventional liquid crystal display device 50, once the optimum applied voltage is set by adjusting a resistance value of the variable resistor 51 in the offset circuit 52, which is mounted to generate the optimum applied voltage for the prevention of flickers, it is impossible to change the optimum applied voltage by readjusting the resistance value of the variable resistor 51 during operation of the liquid crystal display device 50. That is, it is impossible to prevent the occurrence of flickers caused by switch of the display mode carried out during operation of the liquid crystal display device 50.

SUMMARY OF THE INVENTION

An object of the present invention is to provide an active matrix display device in which even when a display mode is switched among a plurality of display modes, an optimum applied voltage for a common electrode or a source electrode is reset in accordance with each of the display modes to suppress the occurrence of flickers, thus allowing the display device to maintain a high quality of display all the time.

In order to achieve the above object, in an active matrix display device according to the present embodiment including a display panel, a common electrode, and a source electrode, in which the common electrode and the source electrode are disposed so as to sandwich the display panel therebetween, and having a plurality of display modes, in order to match a center of a voltage waveform of a voltage applied to the common electrode with a center of a voltage waveform of a voltage applied to the source electrode in each of the display modes, the active matrix display device includes:

storage means for storing optimum voltages each of which is applied to an electrode whose voltage waveform is intended to be shifted; and voltage applying means for reading out the optimum voltage corresponding to the display mode from the storage means and applying the read optimum voltage to the electrode whose voltage waveform is intended to be shifted.

In the above active matrix display device, in each of the display modes, an optimum voltage is read out from the storage means to match the center of the voltage waveform of the voltage applied to the common electrode with the center of the voltage waveform of the voltage applied to the source electrode, and the read optimum voltage is applied to the common electrode or the source electrode. Therefore, it is possible to suppress the occurrence of flickers even if the display mode is switched to another mode during operation of the active matrix display device, thus allowing the display device to maintain a high quality of display all the time.

For example, in the case the active matrix display device is a liquid crystal display device, a liquid crystal drive voltage for driving a liquid crystal layer in a display panel is substantially determined in accordance with a voltage applied to the common voltage and a voltage applied to the source electrode. Because of this, mismatch between the center of the voltage waveform of the common electrode voltage and the center of the voltage waveform of the source electrode voltage causes variation of a voltage supplied as a liquid crystal drive voltage. This causes the occurrence of flickers, resulting in deterioration in quality of display. Especially, in switching a display mode such as reflective mode and transmissive mode, the center of the voltage waveform of the common electrode voltage does not match the center of the voltage waveform of the source electrode voltage with the switch of the display mode, causing degradation in quality of display.

In this connection, the active matrix display device of the present invention stores the respective optimum applied voltages applied to the common electrode or the source electrode for the display modes in order to prevent the occurrence of flickers.

With this arrangement, in switch of the display mode, the voltage applying means read out the optimum applied voltage from the storage means and apply it to the electrode whose voltage waveform is intended to be shifted, thereby matching the respective centers of the voltage waveforms and maintaining a proper voltage waveform of the drive voltage for the display panel. Therefore, it is possible to suppress the occurrence of flickers caused when the display mode is switched, thus allowing the display device to maintain a high quality of display all the time.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention with reference to drawings.

Figure 1:
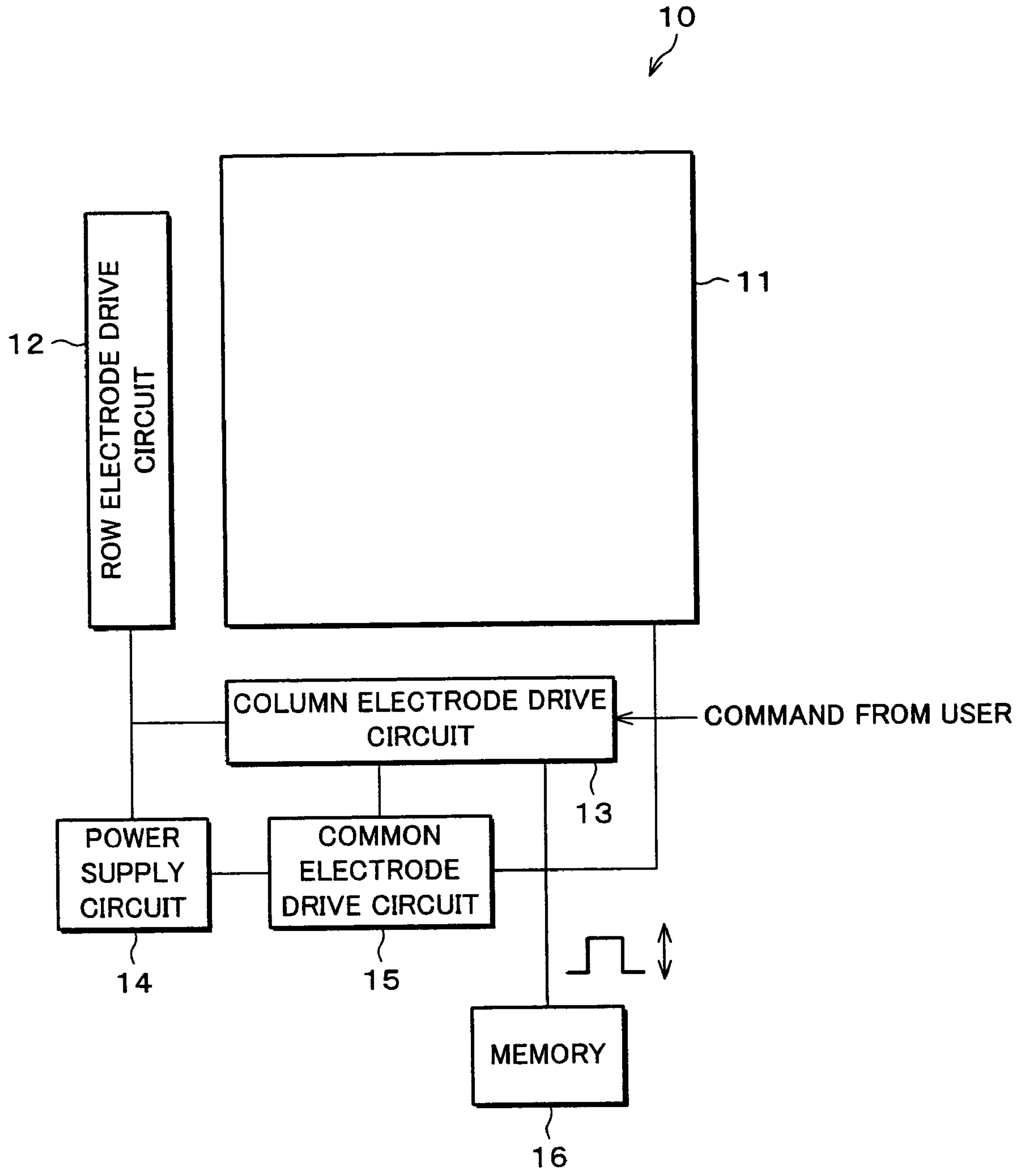
FIG. 1 is a block diagram showing a liquid crystal display device according to one embodiment of an active matrix display device of the present invention.

A liquid crystal display device 10 of the present embodiment, as shown in FIG. 1, includes a liquid crystal display panel 11, a row electrode drive circuit (scanning signal line drive circuit) 12, a column electrode drive circuit (source signal line drive circuit, voltage applying means) 13, a power supply circuit 14, a common electrode drive circuit (voltage applying means) 15, and a memory (storage means) 16.

The liquid crystal display panel 11 is realized by a liquid crystal filled between a pair of glass substrates. Display on the liquid crystal display panel 11 is carried out in such a manner that a liquid crystal drive voltage determined depending on electric potential difference between the respective voltages applied to a common electrode and a source electrode (both not shown) disposed so as to sandwich the liquid crystal display panel 11 therebetween is applied to the respective liquid crystal layers of pixels aligned in a matrix manner.

The row electrode drive circuit (scanning signal line drive circuit) 12, which is connected to a plurality of gate signal lines, applies a voltage to a gate electrode out of three terminals (gate, source, and drain) making up a TFT (Thin Film Transistor) provided to each of the pixels of the liquid crystal display panel 11.

The column electrode drive circuit 13, which is connected to a plurality of source signal lines intersecting at right angle with the gate signals lines, applies a voltage to the source electrode out of the three terminals making up the TFT. In addition, the column electrode drive circuit 13 has an LCDC (Liquid-Crystal Display Controller) incorporated therein to control the liquid crystal drive voltage.

The power supply circuit 14, which is connected to the row electrode drive circuit 12, the column electrode drive circuit 13, and the common electrode drive circuit 15, supplies power to these drive circuits.

The common electrode drive circuit 15, which is connected to common electrode drive wires, applies a voltage to the common electrode disposed on the opposite side where a pixel electrode is disposed of the liquid crystal display panel 11.

The memory 16, which is a nonvolatile memory accessible by a command interface, stores the respective optimum applied voltages for the source electrode corresponding to display modes of the liquid crystal display device 10, reflective mode and transmissive mode.

With the above arrangement, in the case where the display mode is switched from the reflective mode to the transmissive mode or from the transmissive mode to the reflective mode, the liquid crystal display device 10 of the present embodiment can selectively read out from the memory 16 an optimum applied voltage in accordance with a switched display mode to match the center of the voltage waveform for the common electrode voltage with the center of the voltage waveform for the source electrode voltage. With this, the optimum applied voltage is applied to the source electrode to shift the voltage waveform for the source electrode voltage, facilitating a match between the center of the voltage waveform for the common electrode voltage and the center of the voltage waveform for the source electrode voltage. As a result of this, it is possible to prevent variations of the liquid crystal drive voltage caused when the display mode is switched and to suppress the occurrence of flickers, thus enhancing a quality of display.

In addition, in the case where the voltage waveform for the source electrode voltage is shifted in such a manner, the the common electrode voltage may be DC voltage. In this case, the voltage waveform for the source electrode voltage is shifted so that the center of the voltage waveform for the source electrode voltage matches the DC voltage. As in the above case, this makes it possible to suppress the occurrence of flickers, thus enhancing a quality of display.

Note that, a voltage waveform to be shifted, which is not limited to the voltage waveform for the source electrode voltage, may be a voltage waveform for the common electrode voltage.

Moreover, the liquid crystal display device 10 of the present embodiment is provided with the memory 16 capable of storing a plurality of optimum applied voltages. With this arrangement, even in the liquid crystal display device including display modes other than the foregoing reflective mode and transmissive mode, it is possible to store the respective optimum applied voltages corresponding to the display modes and to read out an optimum applied voltage corresponding to a switched display mode. As a result of this, without providing for each display mode a complicated circuit such as an offset circuit including a variable resistor in a conventional manner, it is possible to facilitate a match between the center of the voltage waveform for the common electrode voltage and the center of the voltage waveform for the source electrode voltage. Therefore, even in case of a liquid crystal display device including display modes of three types or more, it is possible to suppress the occurrence of flickers, thus enhancing a quality of display as in the above case.

The following will now describe access means for accessing a memory that stores the respective optimum source electrode voltages corresponding to display modes and shows an optimum source electrode voltage in accordance with a switched display mode. In the following description, a typical three-wire serial system will be given as one example of a system for data transfer to a nonvolatile memory.

Figure 2:
FIG. 2(*a*) is a block diagram showing an access means to a memory which stores respective optimum source electrode voltages corresponding to display modes and shows an optimum source electrode voltage in accordance with switch of a display mode, and FIG. 2(*b*) is a view showing a bit number of data that can be stored in each address space and a variable voltage range.
Figure 2:
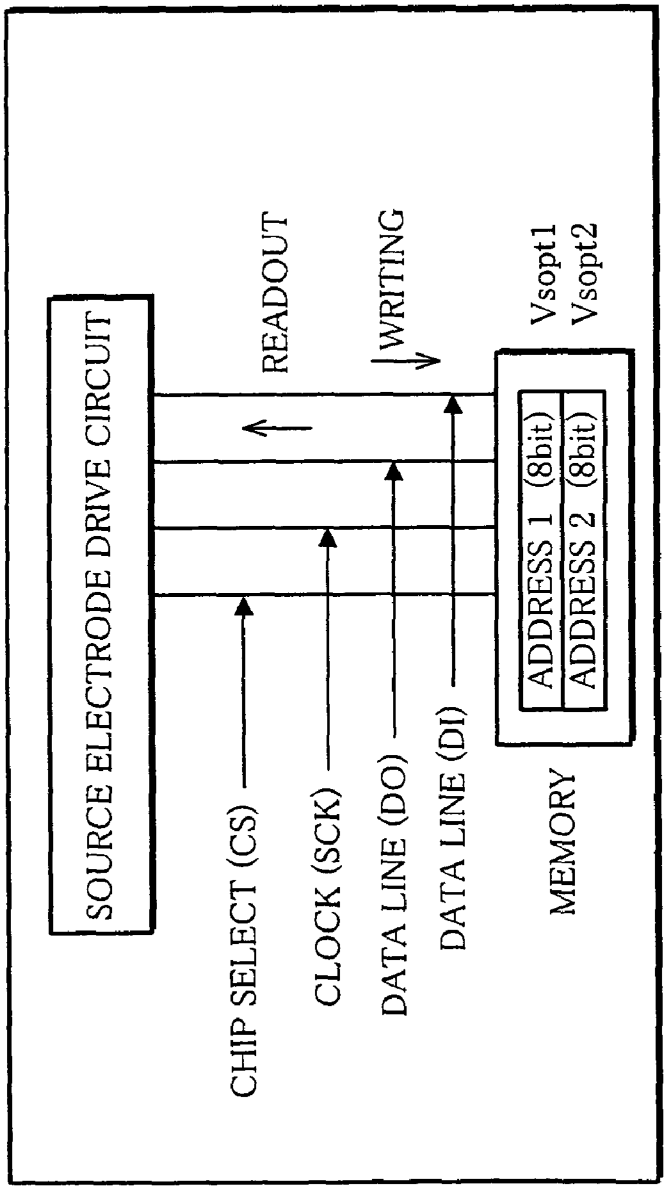

For example, as shown in FIG. 2(*a*), a chip select (CS) and three types of signal lines (CK, DI, and DO) are provided between a memory and a source electrode drive circuit.

The memory includes address spaces 1 and 2. It is assumed that information of the display mode 1 is stored in the address space 1, and information of the display mode 2 is stored in the address space 2.

Here, as shown in FIG. 2(*b*), in the case where a variable voltage range is from 0V to 5V, and 8 bits are data that can be stored in each of the address spaces 1 and 2, the voltage range is divided into 128 ($2^8$) levels to assign a 8-bit signal to each of the levels. This makes it possible to store the respective optimum applied voltages corresponding to the display modes in the form of bit values.

Figure 3:
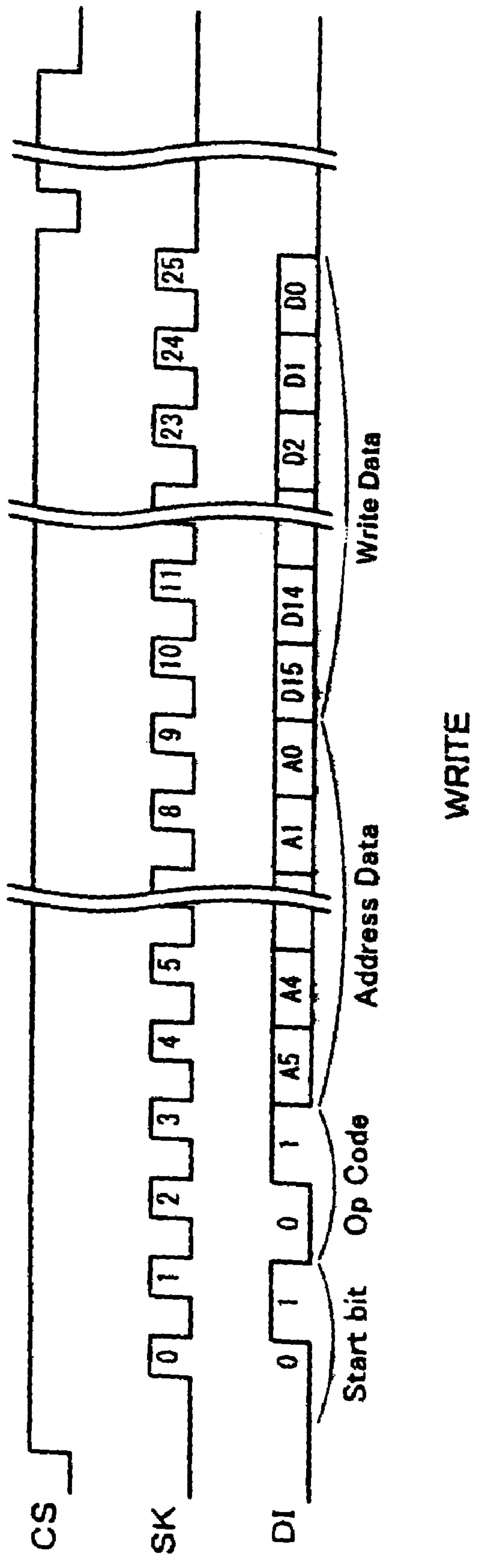
FIG. 3 is a timing chart illustrating how to store an optimum applied voltage in the memory.

Referring to FIG. 3, the following will describe a process for storing optimum applied voltages in the memory. Note that, this process is carried out only once during manufacture of the display device.

In the case where an optimum source electrode voltage Vs_opt1 of the display mode 1 is stored in the memory, after a nonvolatile memory is selected by a CS signal, data "001" indicating WRITE, address data (for example, "00000001")), and a 8-bit signal that is data of an optimum applied voltage desired to be stored in the memory are transmitted by a clock (SK) from a data line (DI).

This allows the optimum source electrode voltage Vs_opt1 of the display mode 1 to be stored in the address space 1 of the memory.

Also in the case of the display mode 2, an optimum source electrode voltage Vs_opt2 of the display mode 2 can be stored in the address space 2 of the memory in the same manner as the display mode 1.

Figure 4:
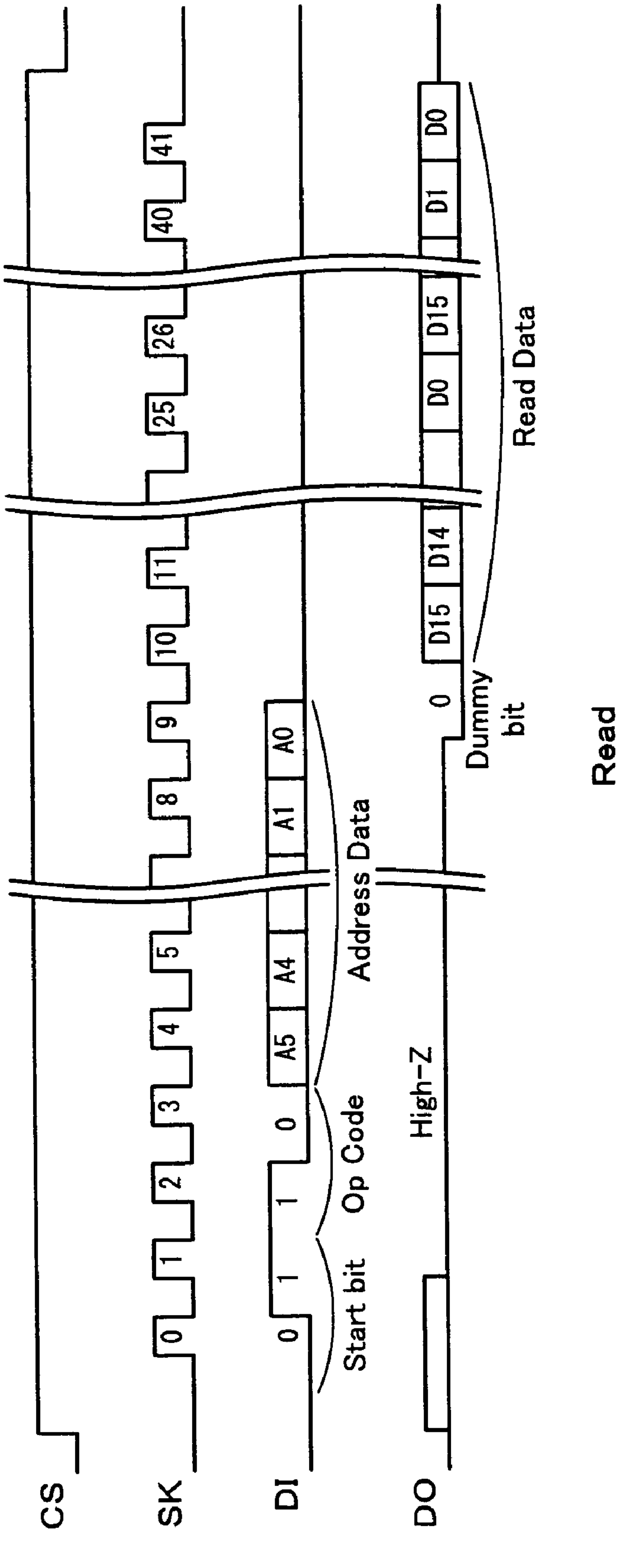
FIG. 4 is a timing chart illustrating how to read out an optimum applied voltage from the memory.

Next, referring to FIG. 4, the following will describe a process for reading out an optimum applied voltage from the memory. Note that, this process must be carried out for each change of the display mode and is carried out frequently during operation of the display device.

In the case where the optimum source electrode voltage Vs_opt1 of the display mode 1 is read out from the memory, after a nonvolatile memory is selected by the CS signal, data "0110" indicating READ and address data (for example, "00000001") are transmitted by the clock (SK) from the data line (DI). Consequently, the data Vs_opt1 that has been stored at the corresponding address is outputted from the memory through a data line (DO) in synchronism with the clock (SK), so that this data can be acquired into the source electrode drive circuit.

Also, readout of the optimum source electrode voltage Vs_opt2 of the display mode 2 from the address space 2 of the memory is carried out in the same manner as described above.

Figure 5:
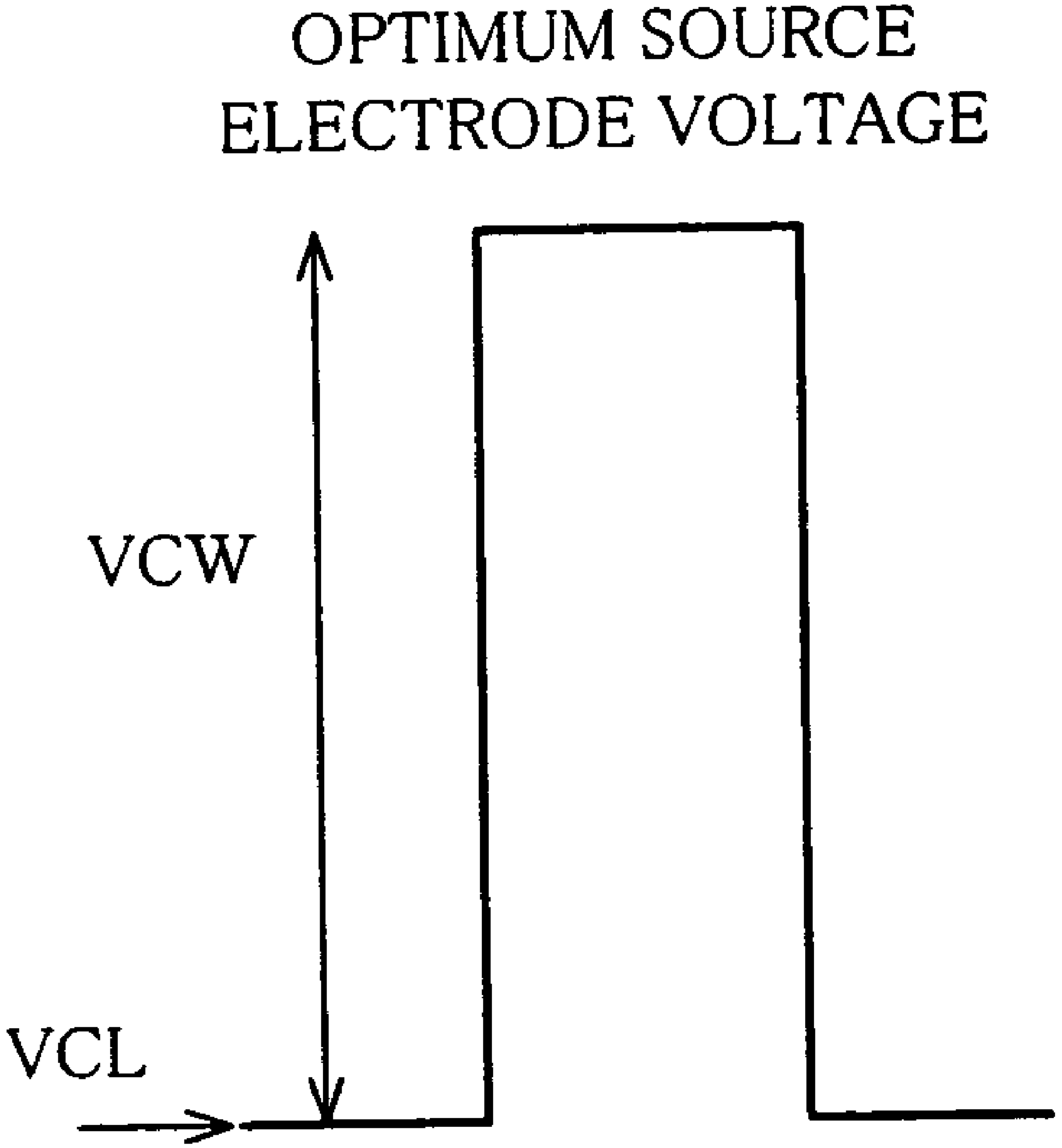
FIG. 5 is a waveform chart showing the lowest value and a voltage width of an optimum source electrode voltage.

Further, in the case where the source electrode or the common electrode is driven by AC voltage, information on electric potential level alone may be stored as data. However, it is more desirable to store two kinds of information, which are information on electric potential level and information on amplitude. For example, as shown in FIG. 5, two kinds of information Vcl and Vcw, which respectively are the lowest value and a voltage width of the optimum source electrode voltage for each display mode, are stored in the memory. Then, Vcl and Vcw are read out from the memory to be applied with the common electrode voltage to the display panel. This allows operation with an optimum drive voltage.

As to an approach for controlling data transmission and reception between the source drive circuit and the memory, in the case where the command (CPU bus) interface system is adopted between the main body and the display device, a command for data transmission and reception should be provided. In the case where the RGB data bus system by a synchronization signal is adopted, a signal input terminal for control should be provided additionally.

Figure 6:
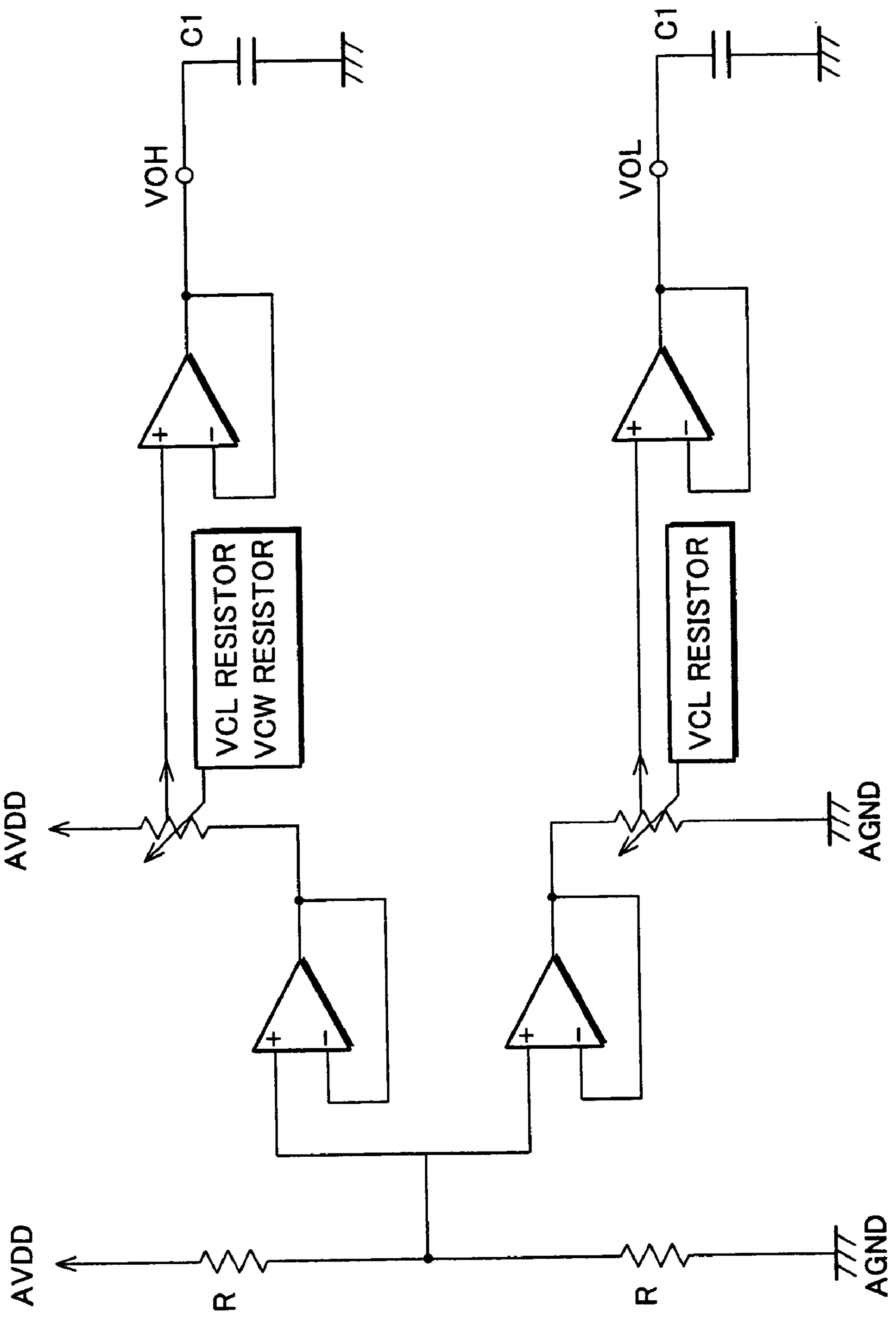
FIG. 6 is a circuit diagram showing an electronic volume circuit which is incorporated in a column electrode drive circuit of the liquid crystal display device shown in FIG. 1.

Finally, the data that has been read out from the memory are set as an electronic volume value of such an electronic volume circuit as shown in FIG. 6. As a result, a source electrode drive voltage or a common electrode drive voltage corresponding to each display mode is outputted. Note that, the electronic volume circuit shown in FIG. 6 is an example of an electronic volume circuit realized by changing the source electrode drive voltage.

Figure 7:
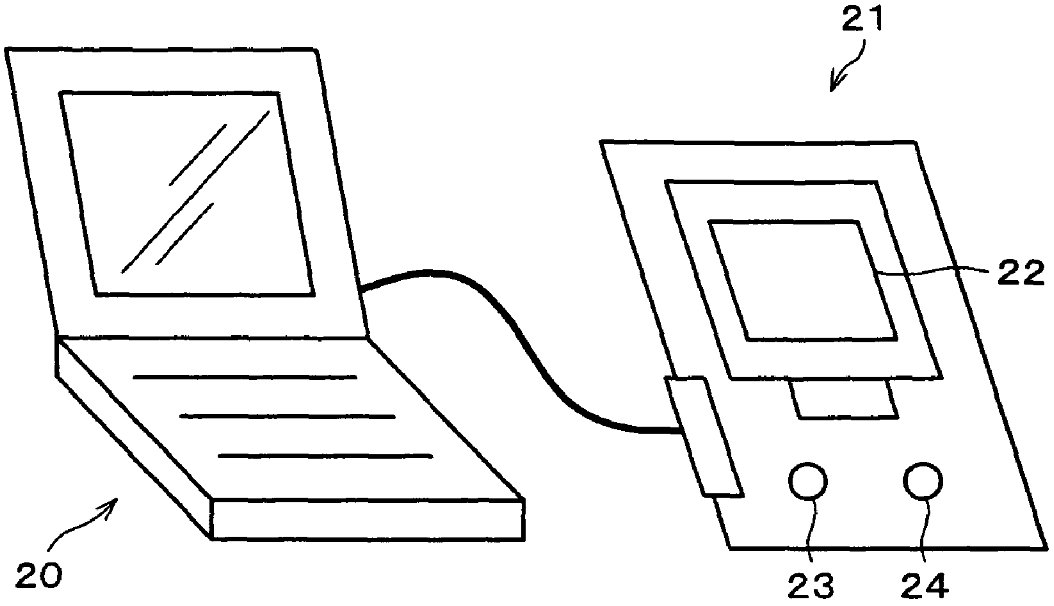
FIG. 7 is a perspective view illustrating input of an optimum applied voltage corresponding to each display mode into a memory included in the liquid crystal display device shown in FIG. 1.

As to an actual environment for setting the respective optimum voltages for the display modes, as shown in FIG. 7, a PC 20 as a control device and a signal source system 21 with functions for change of Vcl and Vcw are connected to each other to display flicker patterns on a display device 22 of the present embodiment.

Figure 8:
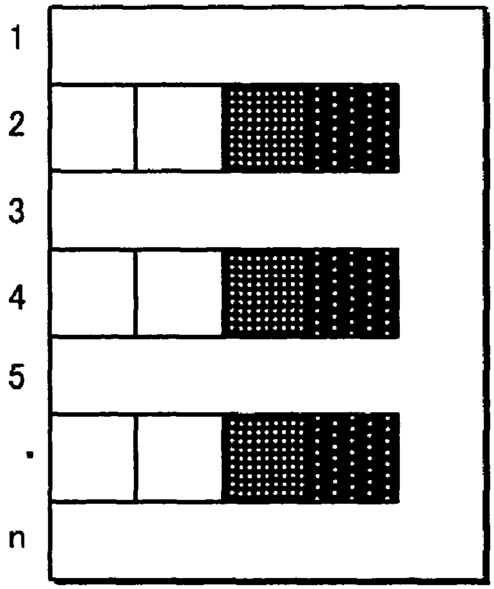
FIG. 8 is a view showing flicker patterns displayed on a liquid crystal display device in input of an optimum applied voltage.
Figure 9:
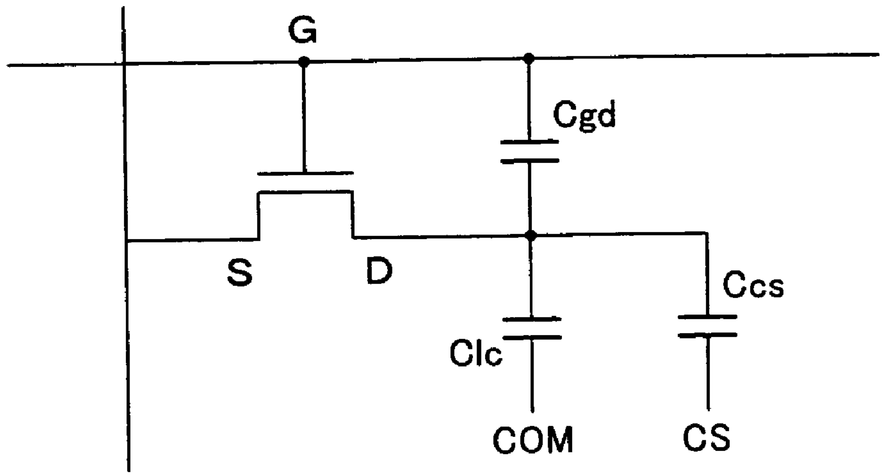
FIG. 9(*a*) is a circuit diagram showing a parasite capacitance between a gate electrode and a drain electrode, and FIG. 9(*b*) is a voltage waveform chart showing a variation value $\Delta V$ of a voltage level written into a source electrode caused when the gate electrode switches from ON to OFF.
Figure 9:
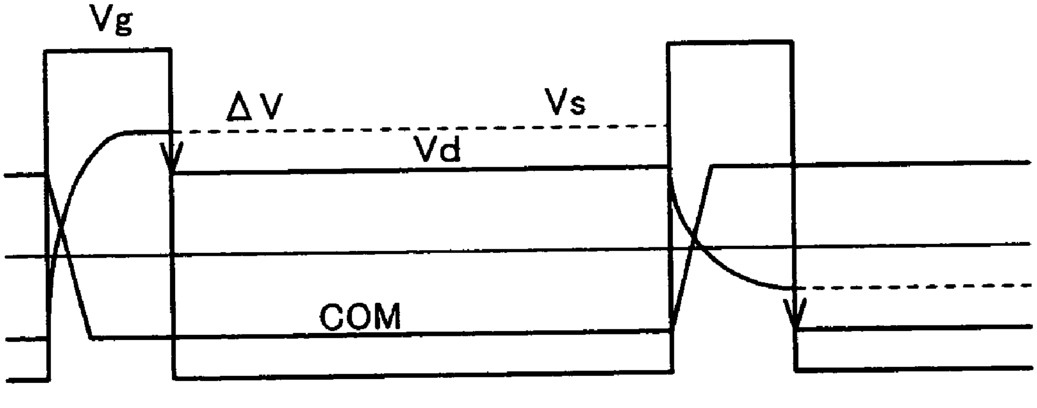
Figure 10:
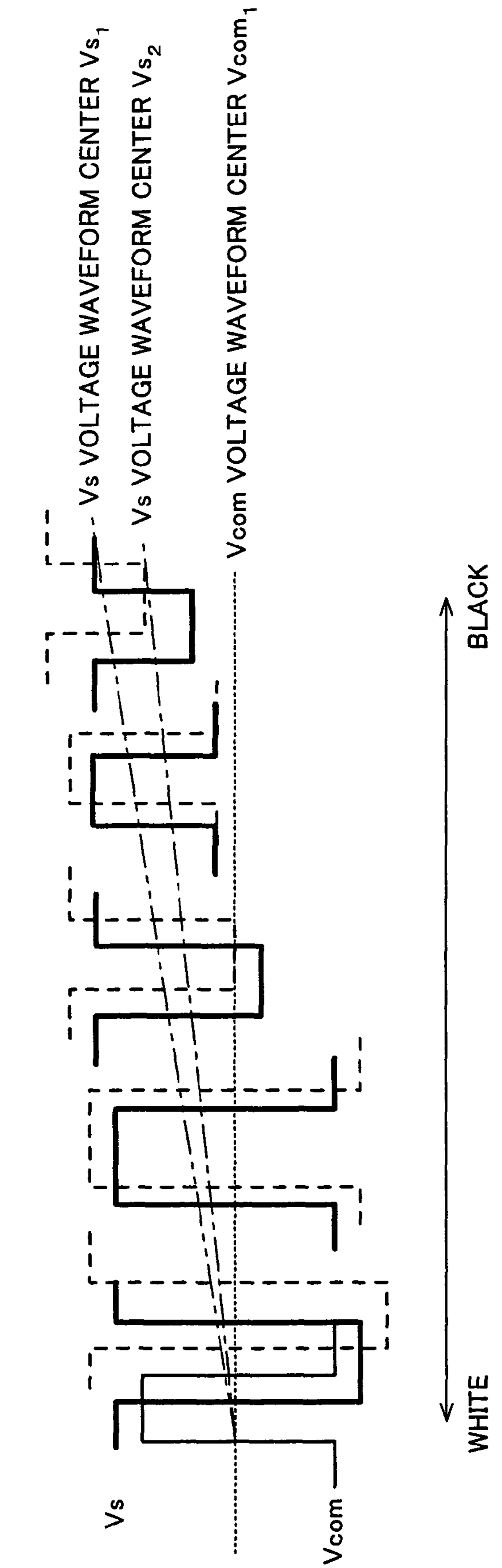
FIG. 10 is a voltage waveform chart showing a difference between the center of the voltage waveform for the common electrode voltage and the center of the voltage waveform for the source electrode voltage.
Figure 11:
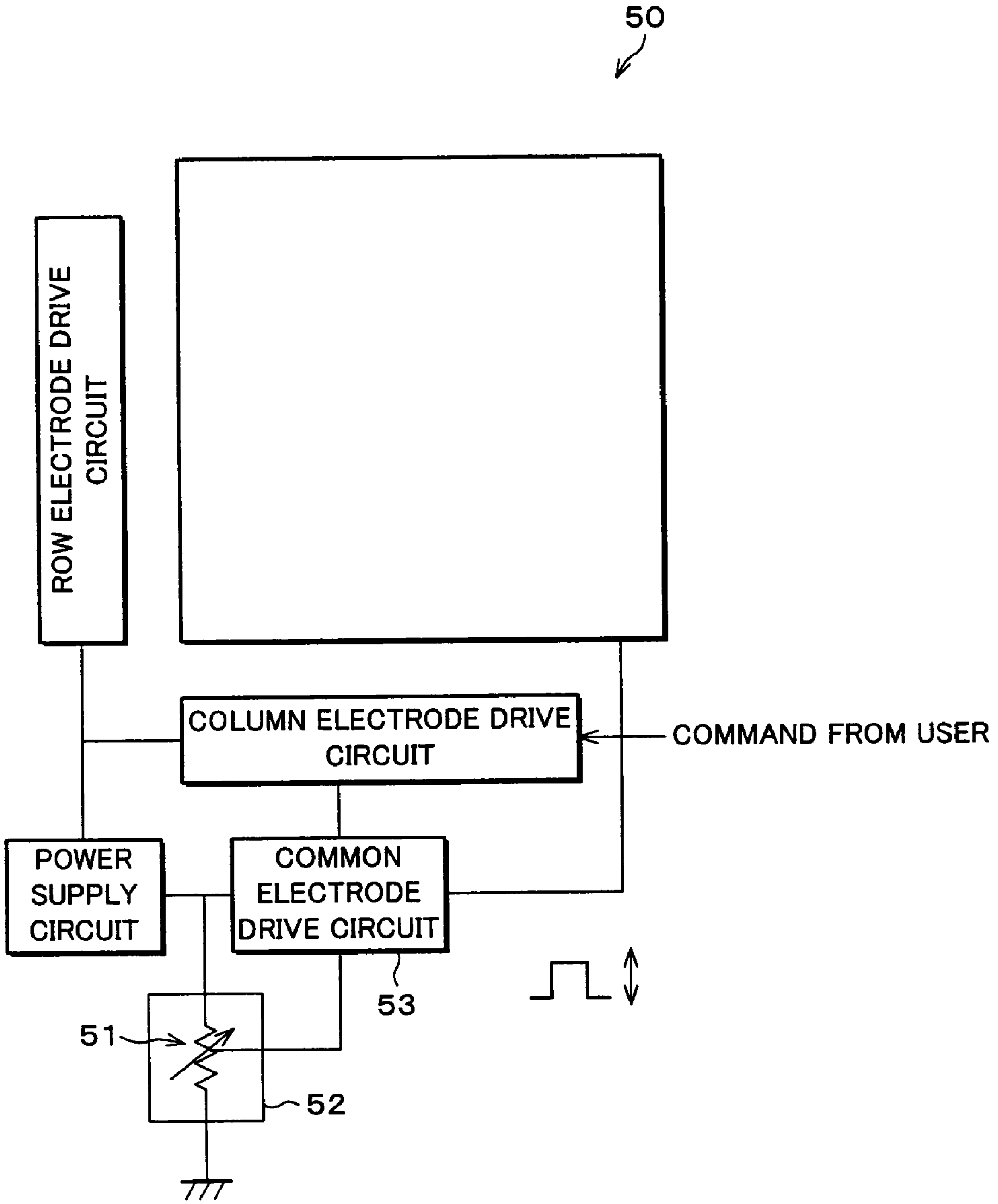
FIG. 11 is a block diagram showing a conventional liquid crystal display device with an offset circuit including a variable resistor.

For example, in case of 1H inversion drive method, it is preferable that flicker patterns repeating black or white and halftones for each one horizontal line are displayed on the display section 22 of the signal source system 21, as shown in FIG. 8, so as to facilitate checking of flickers caused by the above-described halftone displays.

In case of other drive methods, flicker patterns are different in each case.

A quality of display in the display device 22 is checked while increasing and decreasing values of Vcl and Vcw using a Vcl control rotary encoder switch 23, a Vcw control rotary encoder switch 24, an internally-stored control program, and others. Then, values of Vcl and Vcw at which the least flickers occur are transmitted to the column electrode drive circuit 13 mounted on the display device 22 through the use of a write command and stored in the memory 16 mounted on the display device 22. This process is carried out for each display mode to determine the values of Vcl and Vcw at which the least flickers occur.

As described above, the liquid crystal display device 10 of the present embodiment can store in the memory 16 an optimum applied voltage (Vcl and Vcw) capable of matching the centers of voltage waveforms of Vs and Vcom. Therefore, even in the case where the display mode is switched, an optimum applied voltage corresponding to the switched display mode is read out from the memory 16 to apply it to the source electrode so that it is possible to prevent the occurrence of flickers, thus allowing the display device to maintain an excellent quality of display.

Note that, in the present embodiment the description has been given with the liquid crystal display device 10 as an applied example of the present invention. However, the present invention is not limited to this. For example, active matrix display devices such as organic EL, plasma display can obtain the same advantageous effect as the liquid crystal display device 10.

In addition, in the liquid crystal display device 10 of the present embodiment, the common electrode drive circuit 15 and the memory 16, which are externally added to the liquid crystal display device 10, may be internally added to the source electrode drive circuit or a scanning electrode drive circuit.

Further, a shift of a voltage waveform is not limited to a shift in accordance with a display mode. For example, it may be carried out in accordance with a light-emitting state of BL.

Still further, in the present embodiment, although the description has been given with an example in which the optimum applied voltage for the source electrode voltage is adjusted in accordance with each display mode, the present invention is not limited to this. For example, instead of adjusting the optimum applied voltage for the source electrode voltage, adjusting an optimum applied voltage for the common electrode voltage can obtain the same advantage effect.

Yet further, in the present embodiment, the description has been given with an example in which a TFT is adopted for a switching element of the active matrix display device. However, the present invention is not limited to this. For example, MIM (Metal Insulator Metal) that is two-terminal element, and other elements may be adopted for the switching element.

Further, in the present embodiment, although the signal line is adopted in the access means to the memory, there are many methods for controlling a memory (specifications of interface) other than the above example. Therefore, the present invention is not limited to the foregoing example, and it is possible to obtain the same advantageous effect by means of other methods.

Still further, in the present embodiment, although the description has been given with the case where the optimum source electrode voltage is determined using the two kinds of information, the lowest value (Vcl) and the voltage width (Vcw) of the optimum applied voltage for the source electrode, the present invention is not limited to this. For example, information such as two values of the highest value and the voltage width of the optimum source electrode voltage and two values of a center value and the voltage width of the optimum source electrode voltage may be adopted.

Note that, the present invention does not depend on specifications such as command interface included in the display device or digital RGB so long as it is possible to access the memory every time a display mode is changed.

Yet further, in the present embodiment, although the description has been given with the case where both of the source electrode voltage and the common electrode voltage are AC voltage, the present invention is not limited to this. For example, the common electrode voltage may be DC voltage, as in the case of being connected to the ground. Even in such a case, it is possible to obtain the same advantageous effect as the above effect by adjusting the source electrode voltage or the common electrode voltage so that the center of the voltage waveform for the source electrode voltage matches the AC voltage.

As described above, in an active matrix display device according to the present embodiment including a display panel, a common electrode, and a source electrode, in which the common electrode and the source electrode are disposed so as to sandwich the display panel therebetween, and having a plurality of display modes, in order to match a center of a voltage waveform of a voltage applied to the common electrode with a center of a voltage waveform of a voltage applied to the source electrode in each of the display modes, the active matrix display device includes:

storage means for storing optimum voltages each of which is applied to an electrode whose voltage waveform is intended to be shifted; and voltage applying means for reading out the optimum voltage corresponding to the display mode from the storage means and applying the read optimum voltage to the electrode whose voltage waveform is intended to be shifted.

According to the above arrangement, in each of the display modes, an optimum voltage is read out from the storage means to match the center of the voltage waveform of the voltage applied to the common electrode with the center of the voltage waveform of the voltage applied to the source electrode, and the read optimum voltage is applied to the common electrode or the source electrode. Therefore, it is possible to suppress the occurrence of flickers even if the display mode is switched to another mode during operation of the active matrix display device, thus allowing the display device to maintain a high quality of display all the time.

For example, in the case the active matrix display device is a liquid crystal display device, a liquid crystal drive voltage for driving a liquid crystal layer in a display panel is substantially determined in accordance with a voltage applied to the common voltage and a voltage applied to the source electrode. Because of this, mismatch between the center of the voltage waveform of the common electrode voltage and the center of the voltage waveform of the source electrode voltage causes variation of a voltage supplied as a liquid crystal drive voltage. This causes the occurrence of flickers, resulting in deterioration in quality of display. Especially, in switching a display mode such as reflective mode and transmissive mode, the center of the voltage waveform of the common electrode voltage does not match the center of the voltage waveform of the source electrode voltage with the switch of the display mode, causing degradation in quality of display.

In this connection, the active matrix display device of the present invention stores the optimum applied voltages applied to the common electrode or the source electrode respectively for the display modes in order to prevent the occurrence of flickers.

With this arrangement, in switch of the display mode, the voltage applying means read out the optimum applied voltage from the storage means and apply it to the electrode whose voltage waveform is intended to be shifted, thereby matching the respective centers of the voltage waveforms and maintaining a proper voltage waveform of the drive voltage for the display panel. Therefore, it is possible to suppress the occurrence of flickers caused when the display mode is switched, thus allowing the display device to maintain a high quality of display all the time.

It is preferable that the storage means, which are connected to a common electrode drive circuit, store a plurality of voltages for shifting a voltage waveform of a voltage applied to the common electrode in each of the display modes.

With this arrangement, even when the center of voltage waveform for the common electrode voltage does not match the center of the voltage waveform for the source electrode voltage, the optimum applied voltage is applied to the common electrode so that the center of the voltage waveform for the common electrode voltage is matched with the center of the voltage waveform for the source electrode voltage. This makes it possible to suppress the occurrence of flickers caused with switch of the display mode, thus allowing the display device to maintain a high quality of display all the time.

It is preferable that the storage means, which are connected to a source electrode drive circuit, store a plurality of voltages for shifting a voltage waveform of a voltage applied to the source electrode in each of the display modes.

With this arrangement, even when the center of voltage waveform for the common electrode voltage does not match the center of the voltage waveform for the source electrode voltage, the optimum applied voltage is applied to the source electrode so that the center of the voltage waveform for the source electrode voltage is matched with the center of the voltage waveform for the common electrode voltage. This makes it possible to suppress the occurrence of flickers caused with switch of the display mode, thus allowing the display device to maintain a high quality of display all the time.

Note that, in this case, the voltage applied to the common electrode does not need to be AC voltage, and it may be DC voltage. By shifting the voltage waveform for the source electrode voltage so that the center of the voltage waveform for the source electrode voltage matches the value of the DC voltage applied to the common electrode, it is possible to suppress the occurrence of flickers as in the above case.

Note that, the active matrix display device of the present invention can be expressed as an active matrix display device including a storage device capable of writing and reading a voltage level and a light source control device, the active matrix display device comprising level changing means for reading out a source electrode voltage stored beforehand in the storage device in accordance with a state of a light source so that a liquid crystal drive voltage determined in accordance with a common electrode voltage and the source electrode voltage is changed to an optimum voltage during operation of the display device.

Further, the active matrix display device of the present invention can be expressed as an active matrix display device including a storage device capable of writing and reading a voltage level and a light source control device, the active matrix display device comprising level changing means for reading out a common electrode voltage stored beforehand in the storage device in accordance with a state of a light source in the display device so that a liquid crystal drive voltage determined in accordance with a source electrode voltage and the common electrode voltage is changed to an optimum voltage during operation of the display device.

Further, it is preferable that the source electrode drive circuit has an electronic volume circuit incorporated therein. With this arrangement, the drive voltage for the display panel can be controlled by a command from a user such as a command for switching a display mode and a command for writing and reading out an optimum applied voltage into and from the storage means. This makes it possible to control the drive voltage more easily.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An active matrix display device including a display panel with pixels, a common electrode to which a common electrode voltage is applied, and a source electrode to which a source electrode voltage is applied, in which the common electrode and the source electrode are disposed so as to sandwich the display panel therebetween, and having a plurality of display modes, the active matrix display device comprising:

storage means for storing values of optimum applied voltages, each of which voltages is applied to an electrode having a shiftable voltage waveform, so as to match a center of a voltage waveform of the common electrode voltage with a center of a voltage waveform of the source electrode voltage in each of the display modes; and voltage applying means for reading out the value of the optimum applied voltage corresponding to the display mode from the storage means and applying the optimum applied voltage to shift the voltage waveform of the electrode, and wherein each pixel has a switching element for switching ON and OFF application to the pixel of the source electrode voltage, in which a value of the source electrode voltage is set to a value which compensates a variation of the source electrode voltage due to parasitic capacitance of the switching element when the switching element is OFF, and the storage means, which are connected to a common electrode drive circuit, are for storing a plurality of values of the optimum applied voltages for shifting a voltage waveform of a voltage applied to the common electrode, respectively for the display modes.

2. The active matrix display device according to claim 1, wherein:

the storage means stores, as the optimum applied voltage, a lowest value and a voltage width of the optimum applied voltage determined by the variation and the value of the voltage which is applied to the electrode having a shiftable voltage waveform.

3. The active matrix display device according to claim 1, wherein:

the storage means stores, as the optimum applied voltage, a highest value and a voltage width of the optimum applied voltage determined by the variation and the value of the voltage which is applied to the electrode having a shiftable voltage waveform.

4. The active matrix display device according to claim 1, wherein:

the storage means stores, as the optimum applied voltage, a center value and a voltage width of the optimum applied voltage determined by the variation and the value of the voltage which is applied to the electrode having a shiftable voltage waveform.

5. The active matrix display device according to claim 1, wherein:

values of the optimum applied voltages are voltage values to shift a center of the voltage waveform without shifting an amplitude of the voltage waveform.

6. The active matrix display device according to claim 5, wherein the switching element in each pixel is a thin film transistor, the thin film transistor including:

the source electrode which receives a source voltage from a source signal line, a gate electrode which receives a gate voltage from a gate signal line, and a drain electrode which applies the source voltage to the pixel, wherein matching of the centers of the voltage waveforms are to compensate a parasitic capacitance between the gate electrode and the drain electrode.

7. The active matrix display device according to claim 6, wherein the display modes include a reflective mode in which external light is utilized for displays with a back light turned off and a transmissive mode in which a back light is utilized for displays.

8. The active matrix display device according to claim 1, wherein the storage means stores the values of the optimum applied voltages only once during manufacture of the display device.

9. The active matrix display device according to claim 1, wherein the optimum applied voltages are different from each other with respect to each display mode.

* * * * *